United States Patent
Sai et al.

(10) Patent No.: US 10,564,016 B2
(45) Date of Patent: Feb. 18, 2020

(54) ULTRASONIC TRANSDUCERS USING ADAPTIVE MULTI-FREQUENCY HOPPING AND CODING

(71) Applicant: HONEYWELL INTERNATIONAL INC., Morris Plains, NJ (US)

(72) Inventors: Bin Sai, Zuid Holland (NL); Christian Bies, Mainz-Gonsenheim (DE); Fabien Aeschlimann, Seyssinet Pariset (FR)

(73) Assignee: Honeywell International Inc., Morris Plains, NJ (US)

( * ) Notice: Subject to any disclaimer, the term of this patent is extended or adjusted under 35 U.S.C. 154(b) by 40 days.

(21) Appl. No.: 16/039,529

(22) Filed: Jul. 19, 2018

(65) Prior Publication Data
US 2019/0170550 A1   Jun. 6, 2019

Related U.S. Application Data

(60) Provisional application No. 62/595,300, filed on Dec. 6, 2017.

(51) Int. Cl.
*G01F 1/66*   (2006.01)
*G01P 5/24*   (2006.01)

(52) U.S. Cl.
CPC ............ *G01F 1/667* (2013.01); *G01F 1/66* (2013.01); *G01P 5/245* (2013.01)

(58) Field of Classification Search
None
See application file for complete search history.

(56) References Cited

U.S. PATENT DOCUMENTS 7,966,893 B2   6/2011   Straub, Jr.
2015/0292927 A1   10/2015   Satou et al.

*Primary Examiner* — Harshad R Patel

(57) ABSTRACT

An ultrasonic flow meter (UFM) includes a first and second ultrasonic transducer for attaching to a pipe, and a transceiver coupled to the transducers by a multiplexer. A controller having an associated memory runs an adaptive multi-frequency hopping and coding algorithm that selects ≥1 frequency to be hopped within the measured transducer impedance spectrum using a threshold level that selects at least a peak for the phase or a valley for the magnitude, and selects a coding scheme for the chosen frequency to provide a coded frequency sequence. A received signal generated responsive to an ultrasonic signal with the coded frequency sequence into the fluid is decoded, and peak detection is performed on the decoded received signal. The travel time is calculated from the decoded signal, and a speed of the fluid is then determined from the travel time.

16 Claims, 6 Drawing Sheets

ULTRASONIC TRANSDUCERS USING ADAPTIVE MULTI-FREQUENCY HOPPING AND CODING

CROSS REFERENCE TO RELATED APPLICATIONS

This application claims the benefit of Provisional Application Ser. No. 62/595,300 entitled "Ultrasonic transducers using adaptive multi-frequency hopping and coding", filed Dec. 6, 2017, which is herein incorporated by reference in its entirety.

FIELD

Disclosed embodiments relate to ultrasonic flow meters.

BACKGROUND

Ultrasonic flow meters (UFM) that are also known as ultrasonic meters are becoming very popular for flow metering because of their capability to measure a wide range of flow rates, cause minimal pressure drops, and have no-moving parts thus providing less mechanical maintenance. A key hardware component in a UFM is the transducer that comprises a piezoelectric element.

For flow metering two or more piezoelectric element-based transducers transmit and receive ultrasound signals through an encapsulated enclosure to/from fluid substances flowing in the pipe. However, the challenge of having high transducer signal quality still remains in industries such the oil/gas industry because industrial regulations impose specific application requirements including safety for hazardous and flammable zones (e.g., zone 0), high pressure of sometimes up to about 220 bars, and the Organisation Internationale de Métrologie Légale (OIML) class 0.5% over measuring range under disturbances which requires a better signal-to-noise ratio (SNR) and sensitivity to deal with low flow rate while coping with real-time disturbances.

SUMMARY

This Summary is provided to introduce a brief selection of disclosed concepts in a simplified form that are further described below in the Detailed Description including the drawings provided. This Summary is not intended to limit the claimed subject matter's scope.

Conventional UFMs use the same signal coding and driving signal for all individual transducer paths utilized, no matter how many transducer paths there are. To reduce the differences between these paths, pre-calibration is generally performed to select the best matched paths in a UFM. Disclosed aspects recognize for conventional UFMs ultrasonic signal quality is affected by operational modes of the piezoelectric element of the transducers and its surroundings such as its enclosure and filling materials, as well as by generated driving signals that excite the piezoelectric element. Poor signal quality can cause measurement problems such as high signal noise, low amplitude of signal response, inaccurate and/or unstable flow measurements, path failures, and uncorrectable drifting errors, and can even result in the UFM being taken out of operation.

Disclosed UFMs solve the above-described measurement problems for conventional UFMs by using adaptive multi-frequency hopping and coding to provide lower-cost and higher performance. Disclosed aspects include an UFM comprising at least one ultrasonic transducer pair selected based on a matching of their impedance spectrum comprising a first ultrasonic transducer a second ultrasonic transducer spaced apart by a distance for inserting into a pipe or can be configured as a clamp-on device installed outside the pipe, with a transceiver coupled to the ultrasonic transducers by a digitally controlled multiplexer. A controller is coupled to the transceiver that has an associated memory which stores an adaptive multi-frequency hopping and coding algorithm, or the algorithm is implemented as digital logic gates.

The algorithm is for selecting at least one chosen frequency to be hopped within a frequency range or bandwidth of the impedance amplitude and phase spectrum using a threshold level to select at least one peak for the phase or at least one valley for the magnitude, and selecting a coding scheme for the chosen frequency to provide a coded frequency sequence. A received signal that is generated responsive to transmitting an ultrasonic signal with the coded frequency sequence into the fluid is decoded, peak detection is performed on the decoded received signal, and a travel time is calculated from the decoded received signal. A speed of the fluid is then determined from the travel time. Disclosed UFMs and related methods improve the signal quality for given imperfect ultrasonic transducers by improving key signal performance indicators for an UFM including the SNR, early noise package (ENP), and cross-path talks.

DETAILED DESCRIPTION

Figure 1:
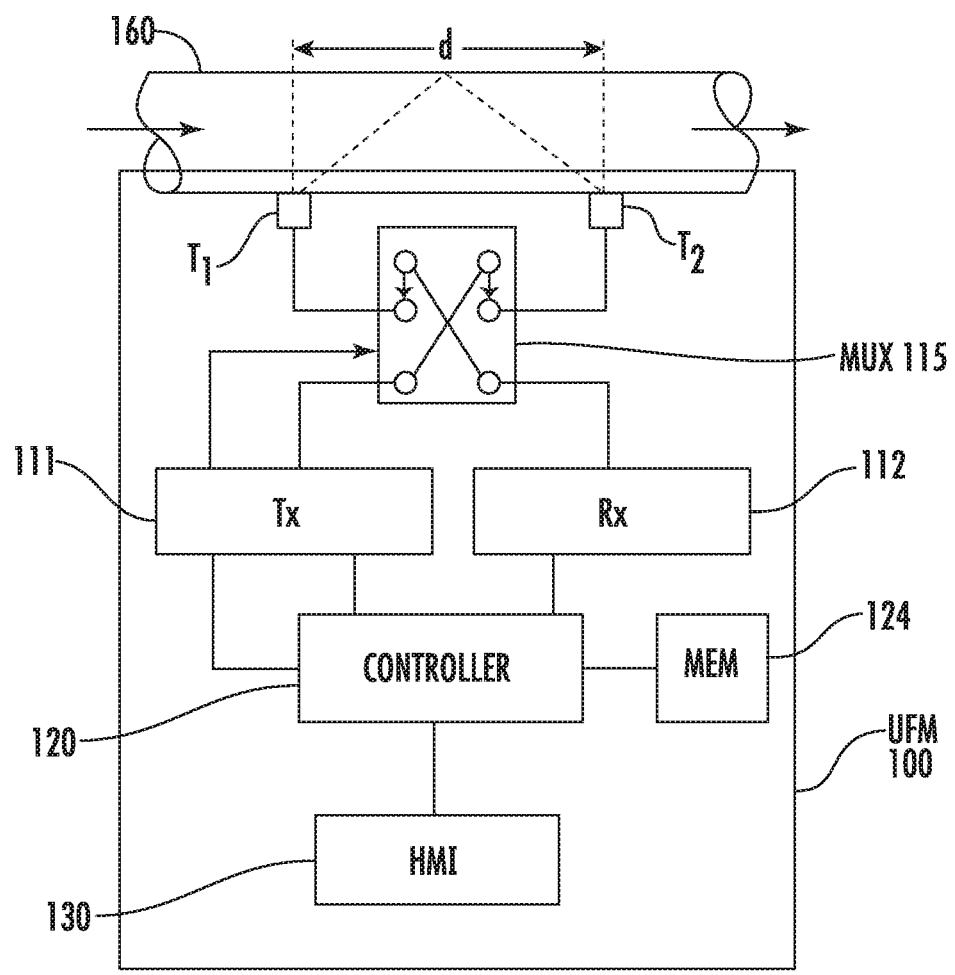
FIG. 1 is block diagram depiction of an example UFM installed for flow measurements of a fluid flowing in a pipe, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is block diagram depiction of an example UFM 100 installed for ultrasonic-based flow measurements of a fluid flowing in a section of a pipe 160, according to an example embodiment. The UFM 100 is shown including a matched ultrasonic transducer pair comprising a first ultrasonic transducer shown as $T_1$ and a second ultrasonic transducer shown as $T_2$ that are spaced apart from one another by a distance shown as d. The ultrasonic transducers $T_1$ and $T_2$ are attached to the pipe 160, generally either being inserted into the pipe 160 using a gas tight and high pressure resistant mechanism or configured as a clamp-on device installed on the outside of the pipe 160. The ultrasonic transducers $T_1$ and $T_2$ employ piezoelectric crystals or piezoelectric ceramics that are set into vibration when an alternating (AC) voltage signal is applied to their piezoelectric element. In operation, ultrasonic pulses are alternately transmitted by one of the transducers and are received by the other transducer needed for the flow measurement.

An axial signal path is shown by the dashed line inside the pipe 160. As known in the art, the UFM can include more than the 2 transducers $T_1$ and $T_2$ shown in FIG. 1, typically up to 16 transducers. UFM 100 includes a transmitter (Tx) 111 and a receiver (Rx) 112, or as an alternative to a separate Tx and Rx as shown there can be a transceiver, coupled to $T_2$ and $T_1$ respectively by a digitally controlled multiplexer (MUX) 115 that enables the transducers $T_2$ and $T_1$ to swap transmit and receive roles. The pipe 160 in operation has a fluid therein, being a liquid or a gas.

UFM 100 also includes a controller 120 generally comprising a microprocessor, digital signal processor (DSP), or a microcontroller unit (MCU) that has an associated memory 124 shown as 'MEM' that can store algorithms including algorithms for implementing disclosed methods. The controller 120 is coupled to the Tx 111 and the Rx 112, and is also coupled to control the MUX 115. However, as known in the art, algorithms run by the controller 120 may be implemented by hardware and/or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the logic gate pattern. Regarding software-based implementations, code for the algorithm is generally stored in a memory such as memory 124 that can be implemented by the controller 120.

There is a human-machine interface (HMI) 130 shown coupled to the controller 120 generally including a keyboard and a display. An operator can use the HMI 130 to adjust parameters generated by a disclosed algorithm such as the threshold level for frequency selection and/or coding sequences, such as if needed to cope with extreme flow conditions and/or specific installation scenarios.

Regarding flow velocity measurement, the acoustic pulses from the transducers are crossing the pipe 160 like a ferryman crossing a river. Without fluid flowing in the pipe 160, acoustic pulses propagate with the same speed in both directions. If the fluid in the pipe has a flow velocity different from zero, acoustic pulses travelling downstream (from $T_1$ to $T_2$) with the flow will move faster, while those travelling upstream (from $T_2$ to $T_1$) against the fluid flow will move slower. Thus, the downstream travel times "$t_{AB}$" will be shorter, while the upstream travel times ones "$t_{BA}$" will be longer as compared when the fluid is not moving. Time of flight (TOF) which herein is refers to herein as directly measuring the travel time of the signal, or indirect methods such as Tx signal-based system cross-correlation or post-processing based cross-correlation can also be used to determine the travel time. The equations below illustrate the computation principle, where they represent the travel time, and velocity of the fluid and velocity of sound in the fluid as a function of the path length and angle of the path relative to the pipe.

$$t_{ABn} = \frac{L_n}{c_n + v_n \cos\varphi_n} \quad (1)$$

$$t_{BAn} = \frac{L_n}{c_n - v_n \cos\varphi_n} \quad (2)$$

$$v_n = \frac{L_n}{2\cos\varphi_n} \cdot \left(\frac{1}{t_{ABn}} - \frac{1}{t_{BAn}}\right) \quad (3)$$

$$c_n = \frac{L_n}{2} \cdot \left(\frac{1}{t_{ABn}} + \frac{1}{t_{BAn}}\right) \quad (4)$$

where: $t_{ABn}$ is the downstream travel time of path n between transducer $T_1$ shown in the equations as transducer A and transducer $T_2$ shown in the equations as transducer B.

$t_{BAn}$ is the upstream travel time of path n between transducers A and B.

$L_n$ is the straight line length of the acoustic path n between the two transducers $T_1(A)$ and $T_2(B)$.

$\varphi_n$ is the angle of path n relative to the pipe.

$v_n$ is the uncorrected raw velocity of fluid measured by transducers of path n.

$c_n$ is the velocity of sound in the fluid measured by transducers of path n.

Figure 2A:
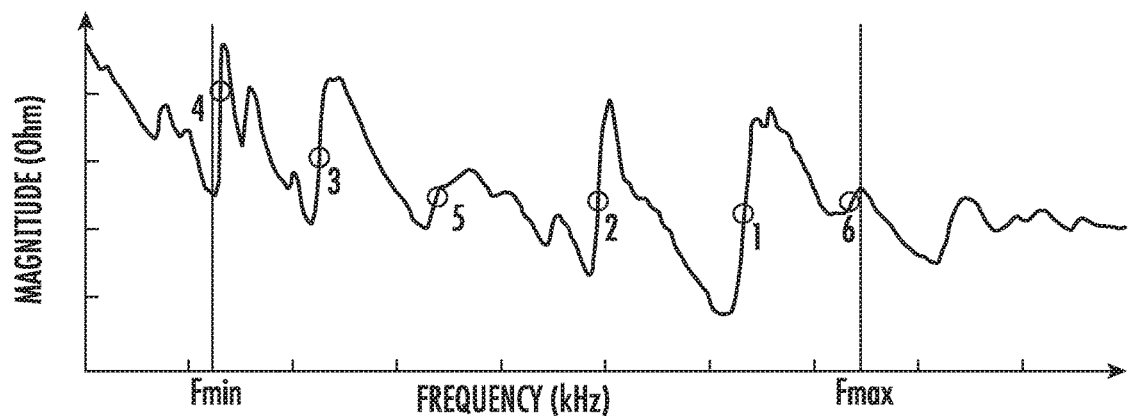
FIGS. 2A and 2B show simulation results for an example ultrasonic transducer showing transducer impedance thresholding to select excitation frequencies to use for UFM operation being magnitude-based from magnitude valleys and phase-based from transducer impedance phase peaks, respectively, according to an example embodiment.
Figure 2B:
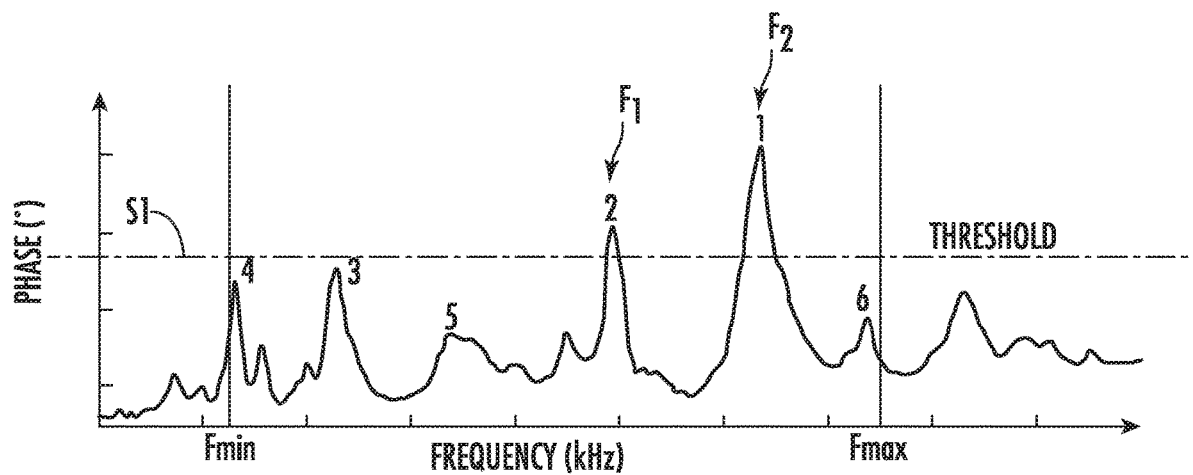

FIGS. 2A and 2B shows simulation results for an example ultrasonic transducer showing transducer impedance thresholding to select excitation frequencies to use for UFM operation being the options of magnitude-based from transducer impedance magnitude valleys and phase-based from transducer impedance phase peaks, respectively, according to an example embodiment. In FIG. 2A a transducer impedance magnitude (in ohms) or in FIG. 2B a phase (in degrees) of a transducer impedance for each of a plurality of ultrasonic transducers as a function of frequency is generally measured to generate an impedance spectrum, such as being from 100 kHz to 300 kHz for both magnitude and phase. Peaks on the phase spectrum identified as 1 to 6 in FIGS. 2A and 2B are shown with peaks being a first frequency (shown being frequency $F_2$) and a second frequency (shown being frequency $F_1$, where $F_2 > F_1$) where in FIG. 2B there are phase peaks above a threshold set at a selected phase value shown as $S_1$. The $F_1$ and $F_2$ lines are located slightly outside the two end phase peaks 4 and 6 because these two peaks should be included in the selected frequency range, so that the span between $F_1$ and $F_2$ is slightly wider than the separation of wanted frequencies (here phase peaks). A bandwidth is also shown selected that extends from an Fmin value to an Fmax value. If the magnitude spectrum in FIG. 2A was to be used instead, a magnitude threshold would be used to identify magnitude troughs. By selecting frequencies and a bandwidth, unwanted resonance signals and clutter that could cause poor SNR and high ENP can be minimized.

Figure 3A:
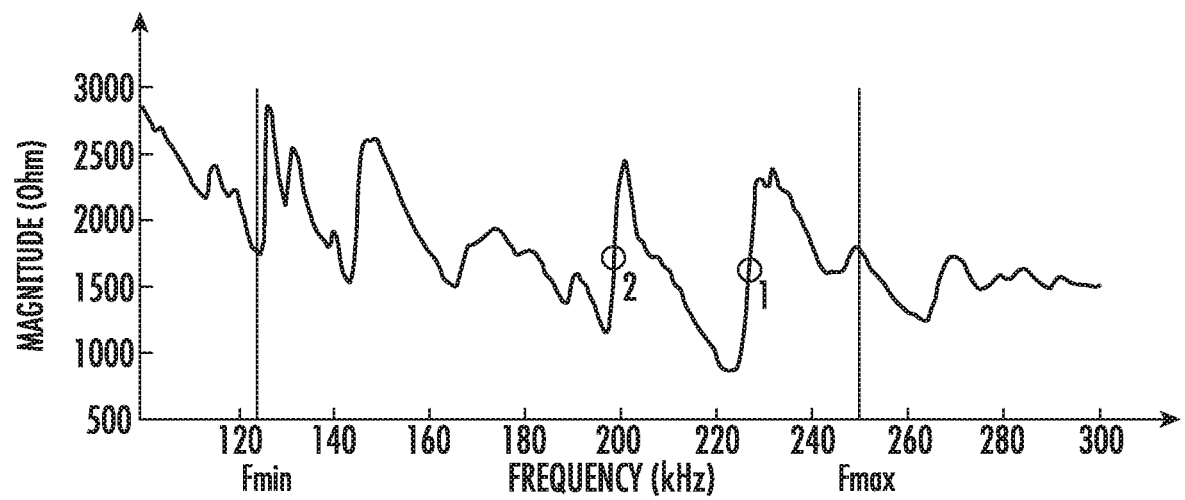
FIGS. 3A and 3B show the selected frequencies $F_1$ and $F_2$ after applying the phase peak thresholding shown in FIG. 2B according to an example embodiment.
Figure 3B:
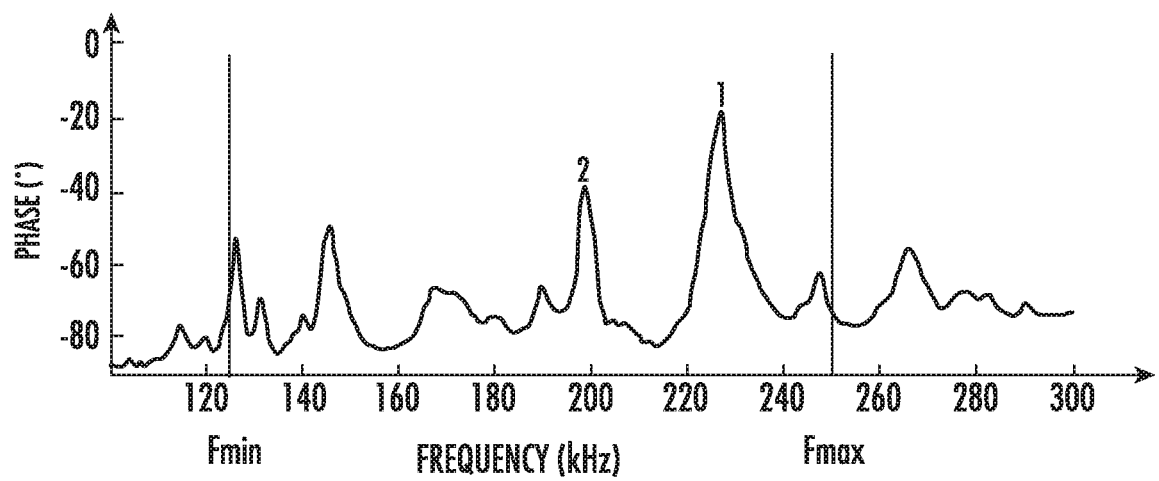

FIGS. 3A and 3B show the selected frequencies $F_1$ and $F_2$ identified as '1' and '2' after applying the phase peak thresholding shown in FIG. 2B, according to an example embodiment. The selected bandwidth (Fmin to Fmax) is also again shown between the spaced apart vertical lines.

Figure 4:
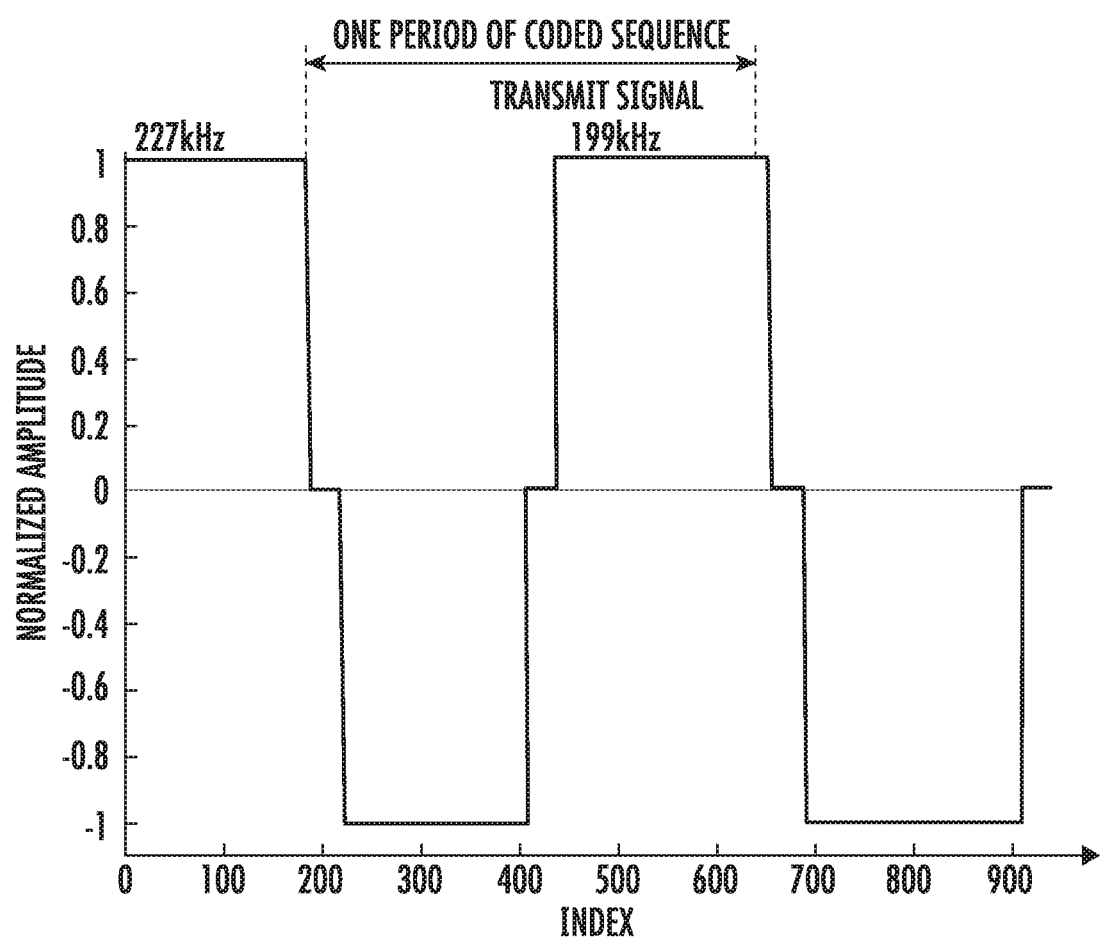
FIG. 4 shows a transmit coded frequency sequence with 2 frequencies and 1 cycle per frequency, according to an example embodiment.

Individual coding and decoding of frequency sequences customized for each matched transducer pair reduces the cross talk between the paths and increases SNR. FIG. 4 shows a transmit coded frequency sequence burst using with the 2 chosen frequencies for operating an ultrasonic transducer being $F_2$ at 227 kHz and $F_1$ at 199 kHz, and at 1 cycle per frequency, according to an example embodiment. The amplitudes are shown normalized. Waveforms although shown having a frequency order of high frequency to low frequency, can also be low frequency to high frequency. Although shown as square waves, the waveforms applied to the transducers can also be sine waves, sawtooth waveforms, or more generally any periodic burst waveform. Multiple cycles can also be used. The time between the adjacent bursts are determined by the path length of a pair of transducers.

Figure 5A:
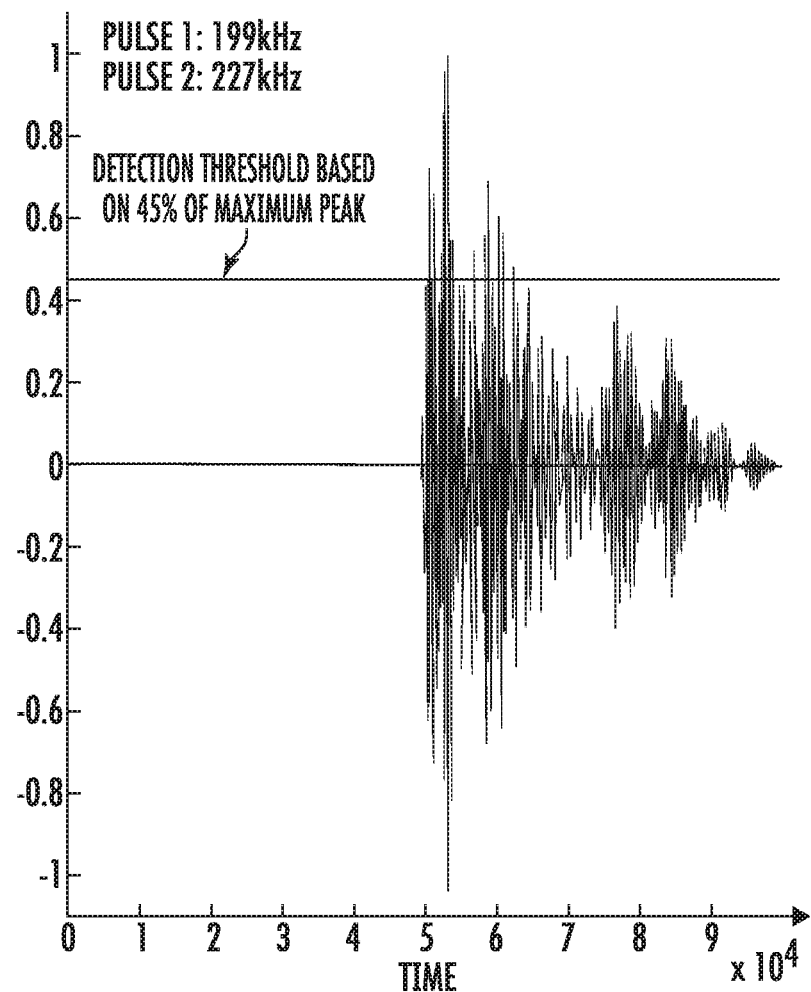
FIGS. 5A and 5B which is a zoomed version of FIG. 5A shows the detection of a decoded signal received with corresponding unique coded frequency sequences.
Figure 5B:
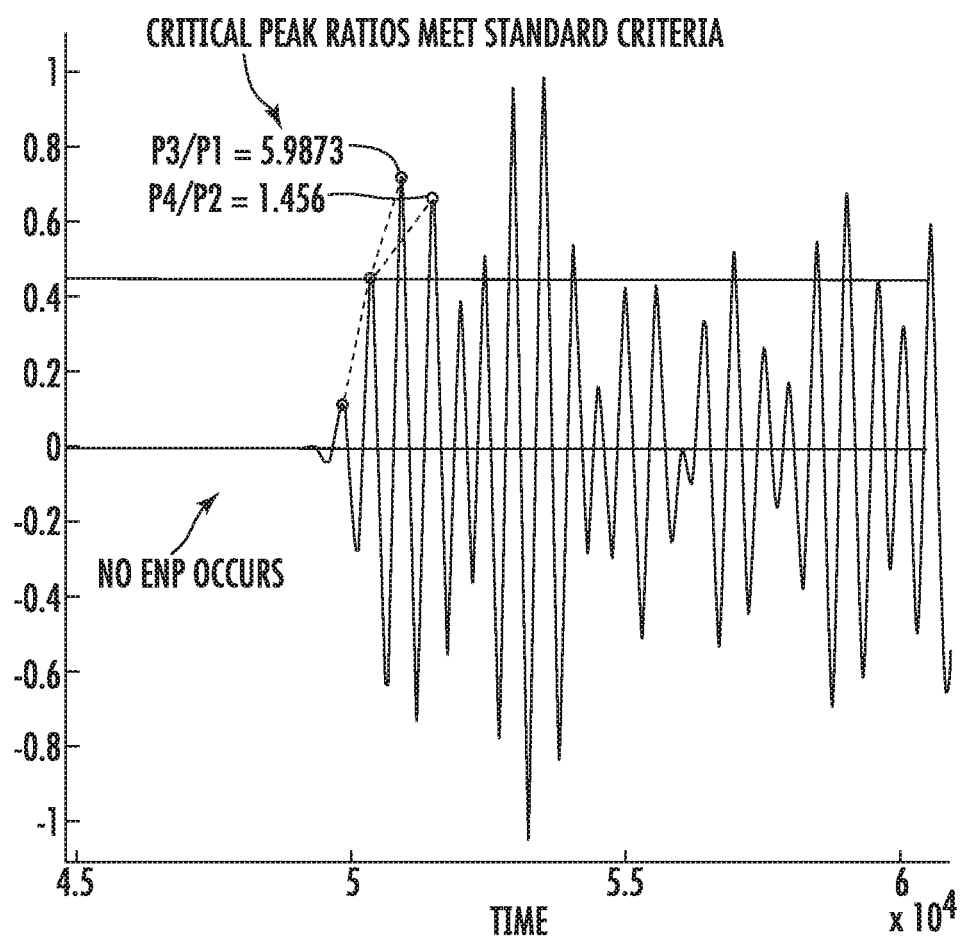

FIGS. 5A and 5B which is a zoomed version of FIG. 5A show signal detection comprising the decoding of ultrasonic signals received with corresponding unique coded frequency sequences. The x-axis in FIGS. 5A and 5B is the sampling index which corresponds to time as shown. The y-axis is normalized volts from 1 to −1 volt. The relative travel time is determined through peak detection. The influencing factors on peak detection and travel time determination however are ENP, second package (part of the signal corresponding to the tail), SNR, and the envelope of signal shape. Those factors are derived from various sources including transducer imperfection, and application conditions. With the methodology disclosed herein, such influencing factors can be improved.

Disclosed adaptive multi-frequency hopping and coding methods thus improve the signal quality for UFMs via algorithms run by software or by digital logic for a given imperfect ultrasonic transducer hardware. Such methods improve the performance of transducer signal quality such as SNR, ENP and cross-path talks.

A method of flow measurement for a fluid flowing in a pipe using an UFM includes measuring a magnitude or a phase of an impedance for each of a sample of ultrasonic transducers as a function of frequency to generate an impedance spectrum. At least one transducer pair is selected from the sample of ultrasonic transducers including a first ultrasonic transducer and a second ultrasonic transducer based on a matching of their impedance spectrums. At least one frequency to be hopped within a bandwidth or frequency range of the impedance spectrum is selected using a threshold level to select at least one peak for the phase or at least one valley for the magnitude. Each measurement path has one transducer pair and can use different frequencies and/or a different number of frequencies, depending upon that paired transducers impedance and phase spectrum. The minimum number of measurement paths utilized can be 1. However, in practice 2 different measurement paths is generally a minimum.

At least one coding scheme is selected for the chosen frequency to provide a coded frequency sequence per path. The coding scheme can be performed with a pulse shape signal coded with a pulse repetition frequency (PRF) equal to the chosen frequency. The coding scheme can be performed with a sinusoid shape signal coded with a sinusoid frequency equal to the chosen frequency, or be performed with a sinusoid coded signal with a pulsed interval where its PRF is equal to the chosen frequency. An ultrasonic signal is transmitted with the coded frequency sequence into the fluid. A received signal that is generated in responsive to the transmitting is decoded. Peak detection is performed on the decoded received signal. A travel time is computed from the decoded received signal, and the speed of the fluid in the pipe is determined from the travel time.

Advantages of disclosed methods and UFMs compared to the state of the art UFMs include individual coding/decoding of frequency sequences per transducer pair (path) so that they can reduce cross talk between paths and increase the SNR. Frequencies that are hopped are those which are determined by selected natural resonance frequencies of particular ultrasonic transducer matched pairs and within meaningful frequency range or bandwidth. In this way, unwanted signals and clutter that can cause poor SNR, high ENP and distortion of signal shape can be minimized which is needed especially for flow measurements at low flow rates where high sensitivity UFM sensing is needed.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of flow measurement for a fluid flowing in a pipe using an ultrasonic flow meter (UFM), comprising:
    measuring a magnitude or a phase of an impedance for each of a sample of ultrasonic transducers as a function of frequency to generate an impedance spectrum;
    selecting at least one transducer pair from said sample of ultrasonic transducers including a first ultrasonic transducer and a second ultrasonic transducer based on a matching of their said impedance spectrum;
    selecting at least one chosen frequency to be hopped within a bandwidth or frequency range of said impedance spectrum using a threshold level to select at least one peak for said phase or at least one valley for said magnitude;
    selecting at least one coding scheme for said chosen frequency to provide a coded frequency sequence;
    transmitting an ultrasonic signal with said coded frequency sequence into said fluid;
    decoding a received signal that is generated in responsive to said transmitting;
    performing peak detection on said decoded received signal;
    computing a travel time from said decoded received signal, and
    using said travel time to determine a speed of said fluid.

2. The method of claim 1, wherein said selecting at least one chosen frequency comprises selecting said valley for said magnitude.

3. The method of claim 1, wherein said selecting at least one chosen frequency comprises selecting said peak for said phase.

4. The method of claim 1, wherein said at least one chosen frequency comprises at least two chosen frequencies, and wherein said at least one coding scheme comprises a plurality of different coded frequency sequences.

5. The method of claim 1, wherein said coding scheme is performed with a pulse shape signal coded with a pulse repetition frequency (PRF) equal to said chosen frequency.

6. The method of claim 1, wherein said coding scheme is performed with a sinusoid shape signal coded with a sinusoid frequency equal to the chosen frequency.

7. The method of claim 1, wherein said coding scheme is performed with a sinusoid coded signal with a pulsed interval where its pulse repetition frequency (PRF) is equal to said chosen frequency.

8. An ultrasonic flow meter (UFM), comprising:
at least one ultrasonic transducer pair selected based on a matching of their impedance spectrum comprising a first ultrasonic transducer and a second ultrasonic transducer spaced apart by a distance for attaching to a pipe;
a transceiver coupled to said ultrasonic transducers by a digitally controlled multiplexer;
a controller coupled to said transceiver that has an associated memory which stores an adaptive multi-frequency hopping and coding algorithm, or said algorithm is implemented as digital logic, said algorithm,
selecting at least one chosen frequency to be hopped within a frequency range or bandwidth of said impedance spectrum using a threshold level to select at least one peak for said phase or at least one valley for said magnitude;
selecting at least one coding scheme for said chosen frequency to provide a coded frequency sequence;
decoding a received signal that is generated in responsive to transmitting an ultrasonic signal with said coded frequency sequence into said fluid;
performing peak detection on said decoded received signal;
computing a travel time from said decoded received signal, and
determining a speed of said fluid from said travel time.

9. The UFM of claim 8, wherein said selecting at least one chosen frequency comprises selecting said valley for said magnitude.

10. The UFM of claim 8, wherein said selecting at least one chosen frequency comprises selecting said peak for said phase.

11. The UFM of claim 8, wherein said algorithm is implemented as said digital logic.

12. The UFM of claim 8, wherein said algorithm is implemented as a stored algorithm in said memory.

13. The UFM of claim 8, wherein said at least one chosen frequency comprises at least two chosen frequencies, and wherein said at least one coding scheme comprises a plurality of different coded frequency sequences.

14. The UFM of claim 8, wherein said coding scheme is performed with a pulse shape signal coded with a pulse repetition frequency (PRF) equal to said chosen frequency.

15. The UFM of claim 8, wherein said coding scheme is performed with a sinusoid shape signal coded with a sinusoid frequency equal to the chosen frequency.

16. The UFM of claim 8, wherein said coding scheme is performed with a sinusoid coded signal with a pulsed interval where its pulse repetition frequency (PRF) is equal to said chosen frequency.

* * * * *